US011455252B2

(12) United States Patent
Kalamatianos et al.

(10) Patent No.: US 11,455,252 B2
(45) Date of Patent: Sep. 27, 2022

(54) MULTI-CLASS MULTI-LABEL CLASSIFICATION USING CLUSTERED SINGULAR DECISION TREES FOR HARDWARE ADAPTATION

(71) Applicant: Advanced Micro Devices, Inc., Santa Clara, CA (US)

(72) Inventors: John Kalamatianos, Boxborough, MA (US); Paul S. Keltcher, Boxborough, MA (US); Mayank Chhablani, Boxborough, MA (US); Alok Garg, Boxborough, MA (US); Furkan Eris, Boston, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/454,027

(22) Filed: Jun. 26, 2019

(65) Prior Publication Data
US 2020/0409851 A1 Dec. 31, 2020

(51) Int. Cl.
*G06F 12/0862* (2016.01)
*G06F 16/22* (2019.01)
*G06N 20/20* (2019.01)

(52) U.S. Cl.
CPC ...... *G06F 12/0862* (2013.01); *G06F 16/2246* (2019.01); *G06N 20/20* (2019.01); *G06F 2212/602* (2013.01)

(58) Field of Classification Search
CPC .... G06F 9/3802; G06F 9/3804; G06F 9/3806; G06F 9/3808; G06F 9/381; G06F 9/3812;
(Continued)

(56) References Cited

U.S. PATENT DOCUMENTS 10,401,181 B2* 9/2019 Chai ................. H04W 4/02
2016/0357677 A1* 12/2016 Hooker ............ G06F 12/0862
(Continued)

OTHER PUBLICATIONS

A. Criminisi et al, "Decision Forests: A Unified Framework for Classification, Regression, Density Estimation, Manifold Learning and Semi-Supervised Learning," in Decision Forests: A Unified Framework for Classification, Regression, Density Estimation, Manifold Learning and Semi-Supervised Learning (Year: 2012).*
(Continued)

*Primary Examiner* — Reginald G Bragdon
*Assistant Examiner* — Aaron D Ho
(74) *Attorney, Agent, or Firm* — Volpe Koenig

(57) ABSTRACT

Techniques for generating a model for predicting when different hybrid prefetcher configurations should be used are disclosed. Techniques for using the model to predict when different hybrid prefetcher configurations should be used are also disclosed. The techniques for generating the model include obtaining a set of input data, and generating trees based on the training data. Each tree is associated with a different hybrid prefetcher configuration and the trees output certainty scores for the associated hybrid prefetcher configuration based on hardware feature measurements. To decide on a hybrid prefetcher configuration to use, a prefetcher traverses multiple trees to obtain certainty scores for different hybrid prefetcher configurations and identifies a hybrid prefetcher configuration to used based on a comparison of the certainty scores.

19 Claims, 4 Drawing Sheets

(58) Field of Classification Search
CPC .... G06F 9/3814; G06F 9/3816; G06F 9/3848; G06F 12/0862; G06F 16/2246; G06F 2212/602; G06F 2212/6022; G06F 2212/6024; G06F 2212/6026; G06F 2212/6028; G06N 5/003; G06N 20/00; G06N 20/20
USPC .......................................................... 711/103
See application file for complete search history.

(56) References Cited

U.S. PATENT DOCUMENTS

| | | | | |
|---|---|---|---|---|
| 2017/0123985 | A1* | 5/2017 | Hooker | G06F 9/3802 |
| 2018/0314524 | A1* | 11/2018 | Keskin | G06N 3/0454 |
| 2018/0314533 | A1* | 11/2018 | Azhen | H04L 41/0813 |
| 2019/0065606 | A1* | 2/2019 | Jiang | G06F 16/9535 |
| 2019/0138451 | A1* | 5/2019 | Alam | G06F 12/0862 |
| 2020/0097411 | A1* | 3/2020 | Pusdesris | G06F 5/06 |
| 2020/0192811 | A1* | 6/2020 | Harnik | G06N 20/00 |
| 2020/0234151 | A1* | 7/2020 | Resnick | G06K 9/6256 |

OTHER PUBLICATIONS

M. Pang, K. Ting, P. Zhao and Z. Zhou, "Improving Deep Forest by Confidence Screening," 2018 IEEE International Conference on Data Mining (ICDM), Singapore, 2018, pp. 1194-1199, doi: 10.1109/ICDM.2018.00158. (Year: 2018).*
S. Bhattacharyya, "Confidence in Predictions from Random Tree Ensembles," 2011 IEEE 11th International Conference on Data Mining, Vancouver,BC, 2011, pp. 71-80, doi: 10.1109/ICDM.2011.41. (Year: 2011).*
Tin Kam Ho, "The random subspace method for constructing decision forests," in IEEE Transactions on Pattern Analysis and Machine Intelligence, vol. 20, No. 8, pp. 832-844, Aug. 1998, doi: 10.1109/34.709601. (Year: 1998).*
Fornaser A, De Cecco M, Bosetti P, Mizumoto T and Yasumoto K 2019 "Sigma-z random forest, classification and confidence" Meas. Sci. Technol. 30 12 (Year: 2019).*
J. J. Rodriguez, L. I. Kuncheva and C. J. Alonso, "Rotation Forest: A New Classifier Ensemble Method," in IEEE Transactions on Pattern Analysis and Machine Intelligence, vol. 28, No. 10, pp. 1619-1630, Oct. 2006, doi: 10.1109/TPAMI.2006.211. (Year: 2006).*
Kuncheva L.I., Rodríguez J.J. (2007) An Experimental Study on Rotation Forest Ensembles. In: Haindl M., Kittler J., Roli F. (eds) Multiple Classifier Systems. MCS 2007. Lecture Notes in Computer Science, vol. 4472. Springer, Berlin, Heidelberg, https://doi.org/10.1007/978-3-540-72523-7_46 (Year: 2007).*
Liao, Shih-wei, et al. "Machine Learning-Based Prefetch Optimization for Data Center Applications", Proceedings of the Conference on High Performance Computing Networking, Storage and Analysis, Article No. 56, ACM, 10 pgs., Nov. 2009.
Hashemi, Milad, et al., "Learning Memory Access Patterns", (retrieved from: https://arxiv.org/pdf/1803.02329), 15 pgs., Mar. 6, 2018.
Jimenez, Victor, et al., "Making Data Prefetch Smarter: Adaptive Prefetching on POWER7", Proceedings of the 21st International Conference on Parallel Architectures and Compilation Techniques, pp. 137-146, Sep. 2012.
Dhopdapkar, Ashutosh S. et al., "Managing Multi-Configuration Hardware via Dynamic Working Set Analysis", Proceedings of the 29th Annual International Symposium on Computer Architecture, pp. 233-244, May 2002.
Ebrahimi, Eiman, et al., "Techniques for Bandwidth-Efficient Prefetching of Linked Data Structures in Hybrid Prefetching Systems", 15th International Symposium on High Performance Computer Architecture, pp. 7-17, Feb. 2009.
Ki, Ando, et al., "Adaptive Data Prefetching Using Cache Information", Proceedings of the 11th International Conference on Supercomputing, pp. 204-212, Jul. 1997.
Ramos, Luis, et al., "Low-Cost Adaptive Data Prefetching", Proceedings of the 14th International Euro-Par Conference on Parallel Processing, pp. 327-336, Aug. 2008.
Vanderwiel, Steven P., et al., "Data Prefetch Mechanisms", ACM Computing Surveys (CSUR), vol. 32, Issue 2., pp. 174-199, ACM, New York, NY, Jun. 2000.
Falsafi, Babak, et al., "A Primer on Hardware Prefetching", Synthesis Lectures on Computer Architecture, vol. 9, No. 1, pp. 1-67, Morgan & Claypool Publishers, 2014.
Quinlan, J. R., "Induction of Decision Trees", Machine Learning, vol. 1, Issue 1, pp. 81-106, Kluwer Academic Publishers, Hingham, MA, USA, Mar. 1986.
Quinlan, J. R., "C4.5: Programs for Machine Learning", 304 pages, Morgan Kaufmann Publishers, San Mateo, CA, United States, 1993.
Loh, Wei-Yin, "Classification and Regression Trees", WIREs Data Mining and Knowledge Discovery, vol. 1, Jan./Feb. 2011, pp. 14-22, John Wiley & Sons, Inc., 2011.
Kass, G. V., "An Exploratory Technique for Investigating Large Quantities of Categorical Data", Applied Statistics, vol. 29, No. 2, pp. 119-127, 1980.
Friedman, Jerome H., "Multivariate Adaptive Regression Splines", The Annals of Statistics, vol. 19, No. 1, pp. 1-67, 1991.
Hothorn, Torsten, et al., "ctree: Conditional Inference Trees", The Comprehensive R Archive Network, 34 pages, 2015.
Ho, Tin Kam, "Random Decision Forests", Proceedings of the 3rd International Conference on Document Analysis and Recognition vol. 1, p. 278-282., IEEE Computer Society, Washington, DC, US, Aug. 1995.
Polaka, Inese et al., "Clustering-Based Decision Tree Classifier Construction", Technological and Economic Development of Economy, vol. 16, No. 4, pp. 765-781, 2010.

* cited by examiner

MULTI-CLASS MULTI-LABEL CLASSIFICATION USING CLUSTERED SINGULAR DECISION TREES FOR HARDWARE ADAPTATION

BACKGROUND

Cache memories are frequently present in computer systems to guard against the latency associated with accessing data in system memory. Computer systems with cache memories often implement prefetching algorithms to reduce the miss rate. Prefetching algorithms fetch information into caches, where the information that is fetched is predicted by the algorithm to be used by software at a future time. Improvements to prefetching algorithms are constantly being made.

BRIEF DESCRIPTION OF THE DRAWINGS

A more detailed understanding can be had from the following description, given by way of example in conjunction with the accompanying drawings wherein.

DETAILED DESCRIPTION

Figure 1A:
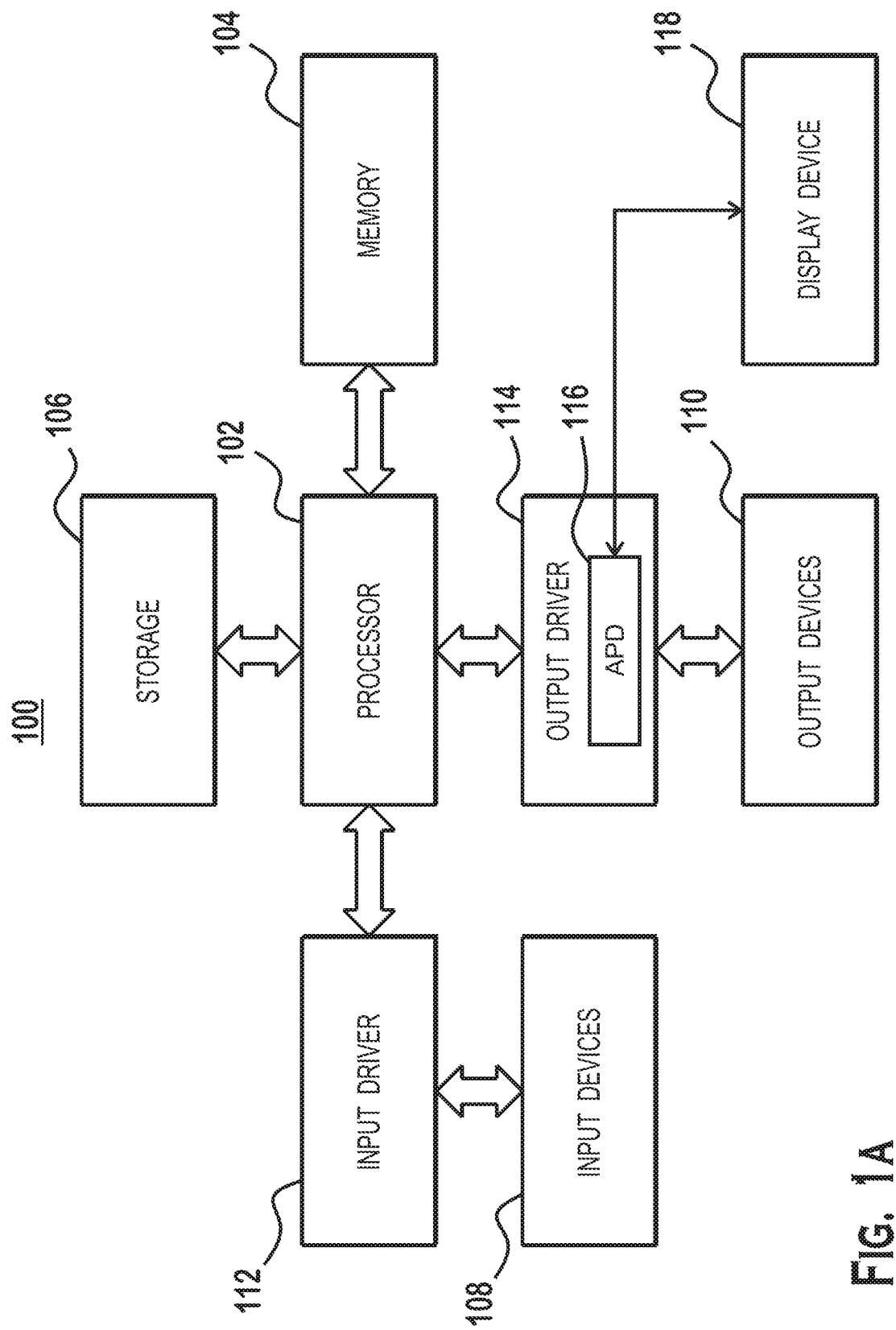
FIG. 1A is a block diagram of an example computing device in which one or more features of the disclosure can be implemented.

Techniques for generating a model for predicting when different hybrid prefetcher configurations should be used are disclosed. Techniques for using the model to predict when different hybrid prefetcher configurations should be used are also disclosed. A hybrid prefetcher is a prefetcher that employs multiple prefetch algorithms concurrently and determines which algorithms will issue prefetch requests to the cache. A hybrid prefetcher configuration is defined by the algorithms that are switched on and the algorithms that are switched off.

The techniques for generating the model include obtaining a set of input data (or "training data"). The input data is obtained by executing a plurality of software traces (software execution flows, or groups of instructions) in different hybrid prefetcher configurations and recording a set of feature measurements (such as number of misses in a level 1 data cache, number of stores committed, number of microcode dispatch breaks, number of level 2 cache lines evicted, and others) and performance metrics for each execution. A set of feature vectors is formed based on this information. Each feature vector includes an identification of the trace run, a set of the feature measurements measured during the execution, an identification of the hybrid prefetcher configuration in which the trace was run, and a measurement of a performance metric measured during the trace run. An example performance metric is instructions per cycle, which indicates the average instructions completed per clock cycle. Each feature vector also receives a classification of either negative (e.g., "0") or positive (e.g., "1"), based on the comparison of the performance metrics across all hybrid prefetcher configurations for a given trace. The hybrid prefetcher configuration that gives the best (e.g., highest for instructions per cycle) performance is labeled as positive. In some implementations, one or more hybrid prefetcher configurations that are within a threshold percentage of the best (e.g., 95% of the maximum for instructions per cycle) also receive a positive classification. Feature vectors that do not receive a positive classification receive a negative classification.

A trainer generates one tree for each hybrid prefetcher configuration, where each tree is a predictor that predicts whether the hybrid prefetcher configuration should be used or not. Specifically, the tree outputs a certainty score regarding whether the associated hybrid prefetcher configuration should be used, given a set of feature measurements. The training process that generates the trees may be any training process that generates a binary decision tree classifier.

In use, each tree accepts input data including hardware feature measurements and outputs a certainty score indicating how certain it is that the hybrid prefetcher configuration corresponding to that tree is the "best" hybrid prefetcher configuration to use, given the feature measurements. The trees include decision nodes and leaf nodes. Each decision node indicates a feature measurement and a threshold and each leaf node indicates a certainty score. To determine a certainty score for a hybrid prefetcher configuration given a particular feature measurement set, a hybrid prefetcher starts at a root node, which is a decision node. The hybrid prefetcher compares the measured value of the feature specified by the decision node to the threshold specified by the decision node and traverses to another node based on the comparison. The hybrid prefetcher continues traversing decision nodes in this manner until arriving at a leaf node, which indicates a certainty score for the hybrid prefetcher configuration associated with the tree, given the input data.

The hybrid prefetcher traverses a plurality of trees for any given set of feature measurements in order to obtain a plurality of certainty scores or the feature measurements. The hybrid prefetcher compares the certainty scores and selects for use one of the hybrid prefetcher configurations based on the comparison. In one implementation, the hybrid prefetcher selects the hybrid prefetcher configuration associated with the tree that provided the highest certainty score. In another implementation, the hybrid prefetcher identifies hybrid prefetcher configurations having certainty scores within a threshold percentage of a maximum certainty score and selects one of the identified hybrid prefetcher configurations.

FIG. 1A is a block diagram of an example computing device 100 in which one or more features of the disclosure can be implemented. The computing device 100 could be one of, but is not limited to, for example, a computer, a gaming device, a handheld device, a set-top box, a television, a mobile phone, a tablet computer, or other computing device. The device 100 includes one or more processors 102, a memory 104, a storage 106, one or more input devices 108, and one or more output devices 110. The device 100 also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices 114 (e.g., controlling operation, receiving inputs from, and providing data to output drivers 114). It is understood that the device 100 can include additional components not shown in FIG. 1A.

In various alternatives, the one or more processors 102 include a central processing unit (CPU), a graphics processing unit (GPU), a CPU and GPU located on the same die, or one or more processor cores, wherein each processor core can be a CPU or a GPU. In various alternatives, the memory 104 is located on the same die as one or more of the one or more processors 102, or is located separately from the one or more processors 102. The memory 104 includes a volatile or non-volatile memory, for example, random access memory (RAM), dynamic RAM, or a cache.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that interface with and drive input devices 108 and output devices 110, respectively. The input driver 112 communicates with the one or more processors 102 and the input devices 108, and permits the one or more processors 102 to receive input from the input devices 108. The output driver 114 communicates with the one or more processors 102 and the output devices 110, and permits the one or more processors 102 to send output to the output devices 110.

In some implementations, the output driver 114 includes an accelerated processing device ("APD") 116. In some implementations, the APD 116 is used for general purpose computing and does not provide output to a display (such as display device 118). In other implementations, the APD 116 provides graphical output to a display 118 and, in some alternatives, also performs general purpose computing. In some examples, the display device 118 is a physical display device or a simulated device that uses a remote display protocol to show output. The APD 116 accepts compute commands and/or graphics rendering commands from the one or more processors 102, processes those compute and/or graphics rendering commands, and, in some examples, provides pixel output to display device 118 for display. The APD 116 includes one or more parallel processing units that perform computations in accordance with a single-instruction-multiple-data ("SIMD") paradigm.

The processors 102 and/or APD 116 include one or more cache memories. Example cache memories include data caches that store data to be operated on by executed instructions and instruction caches that store instructions for execution. In some implementations, the caches are organized in a cache hierarchy. In a cache hierarchy, caches that are lower in the hierarchy have a higher latency but larger capacity and caches that are higher in the hierarchy have a lower latency but smaller capacity. A hierarchical arrangement allows cache misses in one cache to have the possibility of fetching data from a cache that is lower in the hierarchy, rather than from a backing store such as system memory, which reduces overall latency.

In use, a processor operation (such as accessing data or fetching an instruction) attempts to access data or instructions at a particular memory address. If a cache does not contain the accessed data or instruction, the access is said to miss in the cache and the requested data or instruction must be fetched from a lower level cache or a backing store. Cache misses thus represent a substantial degradation in performance.

To combat the decreased performance associated with cache misses, computing systems often implement cache pre-fetching. Cache pre-fetching is a technique whereby certain data or instruction is "predicted" to be needed in the future and is fetched before an anticipated access to that data or instruction occurs. A very large variety of prefetch algorithm types exist. Some examples for instruction cache prefetching include fetch-directed-instruction-prefetching, next-line prefetching, and branch-predictor-directed prefetching. Other types of instruction prefetching exist as well. Some examples for data cache prefetching include stride-based prefetching, stream based prefetching, and other more complicated methods such as temporal streaming and Markov prefetchers.

It is possible to use multiple prefetching techniques simultaneously, in a technique known as hybrid prefetching. Hybrid prefetching allows different techniques, applied at the same time, to generate a different stream of (instruction or data) addresses to prefetch. It is not always optimal to enable all individual prefetching techniques of a hybrid prefetcher. Provided herein are techniques for controlling a hybrid prefetcher to enable or disable individual prefetching techniques depending on measured operational aspects of the computing device to which the prefetching is being applied.

Figure 1B:
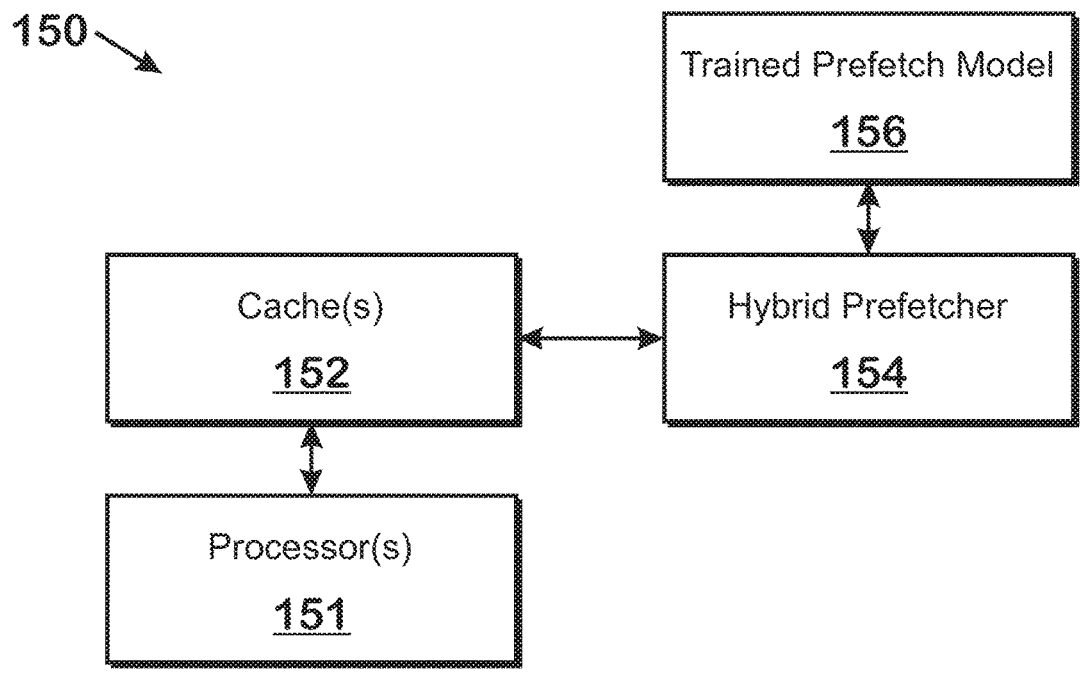
FIG. 1B is a block diagram of a prefetching system according to an example.

FIG. 1B is a block diagram of a prefetching system 150 according to an example. The prefetching system 150 includes one or more processors 151, one or more caches 152, a hybrid prefetcher 154, and a trained prefetch model 156. The hybrid prefetcher 154 may be implemented in any technically feasible manner, including as software or firmware executing on a processor executing instructions that perform the techniques described herein, as fixed function circuitry, such as an application specific integrated circuit, or in any other technically feasible manner. The prefetching system may be a part of the device 100 of FIG. 1A. The processors 151 may be any of the processors 102 or processors in the APD 116, or may be another processor not illustrated or described. The trained prefetch model 156 may be data stored in any technically feasible location such as a memory, a cache, and/or a non-volatile memory or storage device.

The trained prefetch model 156 includes data that specifies a plurality of decision trees used by the prefetcher 154 to determine which prefetch techniques to use, given measurements obtained from the one or more processors 151. Each tree indicates whether a particular hybrid prefetcher configuration should be used. A hybrid prefetcher configuration is defined as, for each prefetcher technique of the hybrid prefetcher 154, whether that technique is switched on or off. In an example, the hybrid prefetcher 154 uses a stride-based prefetch technique and a stream-based prefetch technique. Because there are two prefetching techniques, the number of possible prefetcher configurations is four—both on, both off, stride on and stream off, and stream on and stride off. Although this specific example of a hybrid prefetcher is described, this example should not be taken to be limiting, and the hybrid prefetcher 154 may implement any combination of prefetching techniques.

The trees of the trained prefetch model are binary decision trees. As described elsewhere herein, each tree is associated with a single hybrid prefetcher configuration. Each node of each tree is either a leaf node that indicates a certainty score for using the prefetcher configuration associated with that tree, or is a decision node that points to two different paths, where the choice of which path to take is dependent on a measurement of a computing feature. Additional details regarding the decision trees are provided elsewhere herein, including in FIG. 2.

In use, the hybrid prefetcher 154 traverses the trees in the trained prefetch model 156 to determine which hybrid prefetcher 154 configuration to use. In an example, traversing a particular tree is performed as follows. The hybrid prefetcher 154 begins at a beginning ("root") node. If the root node is a decision node, then the hybrid prefetcher 154 determines the measurement specified by that decision node and obtains the threshold specified by that decision node. The measurement is a measurement of some aspect of computing performance, and is also referred to as a "feature measurement" herein. Examples of such aspects of computing performance include number of misses in a level 1 data cache, number of stores committed, number of microcode dispatch breaks, number of level 2 cache lines evicted, and others. Each decision node specifies that if the measurement is greater than a threshold specified by the node, then the hybrid prefetcher 154 traverses to a "greater than" path, to a different node whose identity is specified by the decision node. Each decision node also specifies that if the measurement is not greater than the threshold, then the hybrid prefetcher 154 traverses to a "not greater than" path, to a different node whose identity is specified by the decision node. For a root node that is a decision node, the hybrid prefetcher 154 traverses to the node specified by the measurement for that node, taking one of the two paths specified based on the value actually measured for the corresponding hardware (such as a processor 151).

When the hybrid prefetcher 154 arrives at a leaf node, the hybrid prefetcher 154 determines the certainty score identified for that leaf node. A certainty score is a value that identifies how certain the hybrid prefetcher 154 is that the hybrid prefetcher configuration associated with that tree is the "most desirable" configuration, given the current state of the hardware (i.e., the values of the various measurements used to traverse the tree). The hybrid prefetcher 154 traverses multiple trees and compares certainty scores for each of the trees. Then the hybrid prefetcher 154 selects the hybrid prefetcher configuration with the highest certainty score and operates according to that hybrid prefetcher configuration. In some alternatives, hybrid prefetcher configurations within a threshold percentage of the highest certainty score are identified and one is randomly selected. Operating according to a hybrid prefetcher configuration means operating with the prefetching techniques implemented by the hybrid prefetcher turned on or off according to the hybrid prefetcher configuration.

Figure 1C:
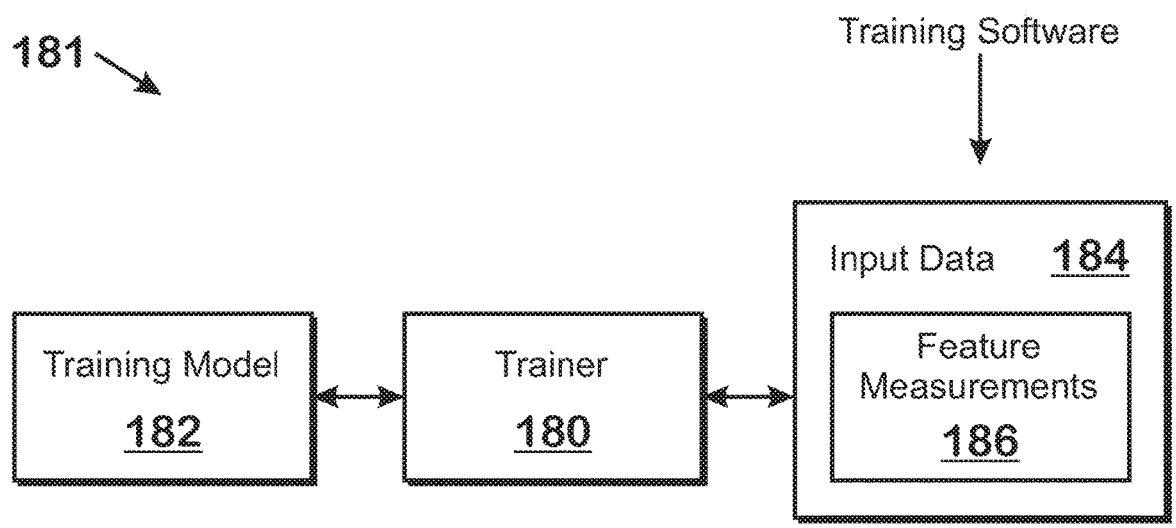
FIG. 1C illustrates a hybrid prefetch model training system, according to an example.

FIG. 1C illustrates a hybrid prefetch model training system 181, according to an example. The hybrid prefetch model training system 181 includes a trainer 180, a training model 182, and input data 184, which includes feature measurements 186. The trainer 180 generates the training model 182 based on the input data 184. After training, the training model 182 becomes the trained prefetch model 156. The trainer 180 may be implemented as software or firmware executing on a processor (such as a processor illustrated or described in FIG. 1A), or as fixed function circuitry (such as an application specific integrated circuit). The training model 182 may be stored in any memory or storage where such storing is appropriate.

The training model includes one or more decision trees that the trainer 180 generates. Any technically feasible technique to generate a decision tree may be used. Some example machine learning techniques for building decision trees include: the iterative dichotomiser 3 algorithm, the C4.5 algorithm, the classification and regression tree ("CART") algorithm, the Chi-squared Automatic Interaction Detector, multivariate adaptive regression spline, "ctree: Conditional Interference Trees," and Random Forest. Although some machine learning techniques for building decision trees are described, any technically feasible technique for building decision trees could be used.

In some implementations, the training system 181 is activated "offline," meaning by a computer system other than the computer system in which the training model 182 is used to make decisions on which prefetcher to use. Then the training model 182 is provided to a computer system and is used to make decisions on which prefetcher to use. In some implementations, the training system 181 is activated "online," meaning that the computer system that includes the prefetching system 150 also includes the hybrid prefetch model training system 181, and activates the hybrid prefetch model training system 181 to train the trained prefetch model 156 (where the trained prefetch model 156 is the same thing as the training model 182). In some implementations, the training system 181 is activated both in an offline mode and in an online mode, in which an initial training model 182 is generated in an offline manner and is then revised online.

Generating the trees is performed as a supervised machine learning task for creating a classification model, where each tree is classification model. For each tree, two classes are possible: a class indicating that the hybrid prefetcher configuration associated with the tree should be used, and a class indicating that the hybrid prefetcher configuration associated with the tree should not be used.

Training the classifier involves the trainer 180 executing training software in the various possible hybrid prefetcher configurations and obtaining and recording feature measurements for the software (where, as described elsewhere herein, the feature measurements are measurements of various aspects of the hardware (such as the processor(s) 151 and cache 152) in each hybrid prefetcher configuration). In addition, for each hybrid prefetcher configuration the trainer 180 also records a performance metric and derives a classification for the executed training software from the performance metric. In an example, the performance metric is instructions executed per cycle, although any technically feasible performance metric is used.

To derive the classification for an item of training software, the trainer 180 determines which hybrid prefetcher configuration is deemed to have the best performance metric. In the example that the performance metric is instructions per cycle, the hybrid prefetcher configuration with the "best" performance metric is the hybrid prefetcher for which the instructions per cycle is the highest. The trainer 180 classifies the input data 184—the feature measurements for the executed software—as having the "most desirable" hybrid prefetcher configuration for the hybrid prefetcher configuration with the "best" performance metric. In some implementations, the trainer 180 also classifies the input data 184 as having the "most desirable" hybrid prefetcher configuration for hybrid prefetcher configurations with a performance metric that is within a threshold percent of the "best" performance metric. In an example where the performance metric is instructions per cycle, an example threshold percent is 95 percent. According to this example, the feature measurements for the software are classified as having the "most desirable" hybrid prefetcher configuration for the hybrid prefetcher configuration having the highest instructions per cycle and also for the hybrid prefetcher configurations having at least 95% of the highest instructions per cycle, if any such hybrid prefetcher configurations exist. A classification of "most desirable" may be associated with a score of 1 and a classification of "less desirable" may be associated with a score of 0.

The above classification is performed for a number of traces, where each trace is a sequence of program flow derived from a software instance. The output of classification is, for any particular hybrid prefetcher configuration, a set of training data. Each item ("feature vector") of training data in a set corresponds to a trace and includes a set of measurements for the features ("feature measurements 186") that were measured for the trace, as well as a classification indicating either that the hybrid prefetcher configuration is a "most desirable" hybrid prefetcher configuration or that the hybrid prefetcher configuration is not a "most desirable" hybrid prefetcher configuration, and an identification of the hybrid prefetcher configuration under which the feature measurements were taken.

Using any technically feasible machine learning technique, such as those described elsewhere herein, the trainer 180 generates the training model 182 based on the input data 184. As is generally known, machine learning techniques can be used to generate a predictive model that predicts a particular classification for a given input, where the predictive model is generated based on input data that provides classifications for training input. Using such a technique, the trainer 180 generates a predictive model that can be used by the hybrid prefetcher 154 to classify measured features from the processor(s) 151, cache 152, and/or other systems, in order to make a determination on which hybrid prefetcher configuration to use.

As described elsewhere herein, the training model 182 includes multiple decision trees—one for each hybrid prefetcher configuration. Each decision tree has the capacity to predict whether the hybrid prefetcher configuration associated with the decision tree is desirable or not. More specifically, as described elsewhere herein, each decision tree provides a certainty score that indicates how certain it is that the hybrid prefetcher configuration associated with the decision tree is the "most desirable" hybrid prefetcher configuration. In some implementations, the classifications of the input data 184 are scores—either 0 or 1. A value of 0 represents that the hybrid prefetcher configuration associated with the item of input data is not a "most desirable" hybrid prefetcher configuration and a value of 1 represents that the hybrid prefetcher configuration is a "most desirable" hybrid prefetcher configuration. The leaf nodes of each tree indicate a certainty score between 0 and 1, which is between the two possible classification scores mentioned above. In a sense, the certainty scores of the leaf nodes represent values intermediate between the 0 and 1 scores, and can therefore be seen as representing the certainty with which the model predicts the associated hybrid prefetcher configuration is appropriate for a set of feature measurements that arrives at the node.

Additional data is used by the trainer 180 to validate the training model 182. In general, validation is a technique in machine learning where data that is different from the data used to generate a predictive model is used to test the predictive model. The validation data is different in order to test for overfitting—the condition where the trained model is too specific to the data used to train the model and thus is difficult or impossible to use for predictive purposes. The validation data is similar to the data used as input to generate the training model 182, in that the validation data includes feature measurements for traces and classifications as described elsewhere herein.

In some implementations, the training process is repeated with varying hyperparameters to find parameters deemed to be the "best." Some example hyperparameters include maximum tree depth, minimum number of elements a leaf must contain, the maximum number of nodes allocated to a tree, the maximum number of feature types.

Figure 2:
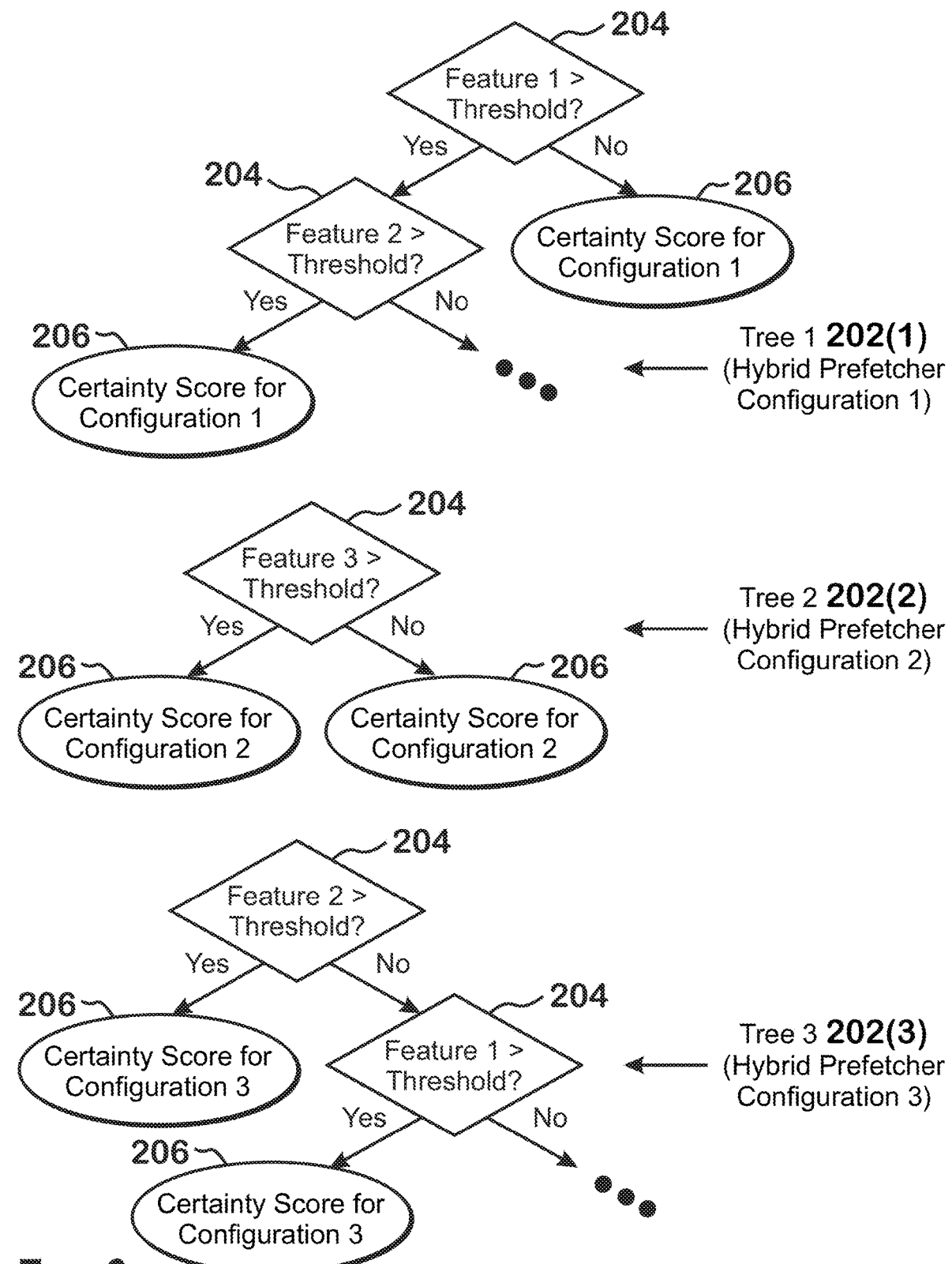
FIG. 2 illustrates an example set of trees for making prefetching decisions.

FIG. 2 illustrates an example set of trees. Tree 1 202(1) is associated with hybrid prefetcher configuration 1, which represents a specific configuration of prefetching techniques of the hybrid prefetcher 154 switched on and off. To use tree 1 202(1) to determine a certainty score for hybrid prefetcher configuration 1, given a set of feature measurements, the hybrid prefetcher 154 traverses the tree. At the root node, which is a decision node 204, the hybrid prefetcher 154 makes a determination of whether a particular feature measurement is above a threshold specified by that decision node 204. If the feature measurement is above the threshold, then the hybrid prefetcher 154 proceeds to the left node which is a decision node 204 and if the feature measurement is not above the threshold, then the hybrid prefetcher 154 proceeds to the right node which is a leaf node 206 (and thus determines the certainty score for hybrid prefetcher configuration 1, given the set of feature measurements).

At the left decision node, the hybrid prefetcher 154 determines whether feature 2 is above a threshold specified for that decision node. If feature 2 is above the threshold, then the hybrid prefetcher 154 proceeds to the left (which is a leaf node and thus leads to a certainty score being determined for the set of feature measurements) and if feature 2 is not above the threshold, then the hybrid prefetcher 154 proceeds to the right. For brevity, the right side is omitted, but additional nodes are present in tree 1.

For tree 2 202(2), which is associated with hybrid prefetcher configuration 2, the hybrid prefetcher 154 examines feature 3, as specified by the root node, which is a decision node 204. If feature 3 is above a threshold specified by the decision node 204, then the hybrid prefetcher 154 proceeds to the leaf node 206 on the left side and if feature 3 is not above the threshold, then the hybrid prefetcher 154 proceeds to the leaf node 206 on the right side. For either leaf node, the hybrid prefetcher 154 determines the certainty score for hybrid prefetcher configuration 2 as specified by that leaf node 206.

For tree 3 202(3), which is associated with hybrid prefetcher configuration 3, the hybrid prefetcher 154 examines feature 2, as specified by the root node, which is a decision node 204. If feature 2 is above a threshold specified by the decision node 204, then the hybrid prefetcher proceeds to the left side and if feature 2 is not above the threshold specified by the decision node 204, then the hybrid prefetcher proceeds to the right side. At the left side, which is a leaf node 206, the hybrid prefetcher determines the certainty score for hybrid prefetcher configuration 3 as specified by that leaf node 206. At the right side, the hybrid prefetcher 154 determines whether feature 1 is above a threshold. If feature 1 is above the threshold, then the hybrid prefetcher 154 proceeds to the left side, where there is a leaf node 206 that specifies a certainty score for the hybrid prefetcher configuration 3. If feature 1 is not above the threshold, then the hybrid prefetcher 154 proceeds to the right side. Additional nodes would be present but are not illustrated in FIG. 2 for brevity.

Figure 3A:
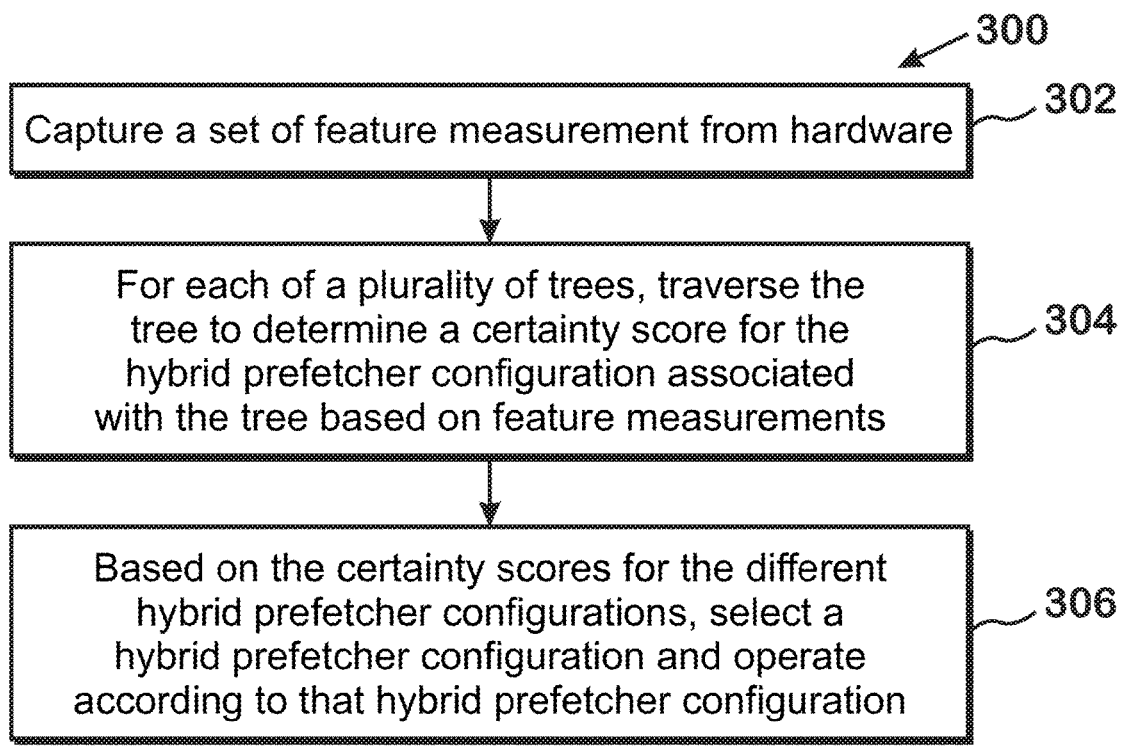
FIG. 3A is a flow diagram of a method for determining a hybrid prefetcher configuration to use based on a trained prefetch model and a set of feature measurements, according to an example.

FIG. 3A is a flow diagram of a method 300 for determining a hybrid prefetcher configuration to use based on a trained prefetch model 156 and a set of feature measurements, according to an example. Although described with respect to the system of FIGS. 1A-1C and 2, those of skill in the art will understand that any system, configured to perform the steps of method 300 in any technically feasible order, falls within the scope of the present disclosure.

The method 300 begins at step 302, where a hybrid prefetcher 154 obtains feature measurements from one or more processors and/or one or more caches 152. As described elsewhere herein, the feature measurements include measurements of number of misses in a level 1 data cache, number of stores committed, number of microcode dispatch breaks, number of level 2 cache lines evicted, and others, and define the operating state of the computing device that the hybrid prefetcher 154 is performing prefetching operations for.

At step 304, the hybrid prefetcher 154 traverses each of a plurality of trees to determine a certainty score for the hybrid prefetcher configuration associated with the tree based on the feature measurements. More specifically, each tree is associated with a particular hybrid prefetcher configuration and includes a set of decision nodes and a set of leaf nodes. Each decision node specifies a feature and a threshold. The hybrid prefetcher 154 traverses a tree by traversing decision nodes until arriving at a leaf node. The hybrid prefetcher 154 traverses a decision node by identifying the feature measurement for the feature specified by the decision node (from the feature measurements captured at step 302). The hybrid prefetcher 154 determines which direction to take from the decision node—right or left—based on whether the feature measurement is greater than the threshold specified by the decision node. When the hybrid prefetcher 154 arrives at a leaf node, the hybrid prefetcher 154 determines, as the certainty score for the hybrid prefetcher configuration associated with the tree, the certainty score specified by that leaf node. The hybrid prefetcher 154 performs this traversal for multiple trees to obtain scores for multiple prefetcher configurations. In some implementations, the hybrid prefetcher 154 obtains certainty scores for each prefetcher configuration for which a tree exists.

At step 306, the hybrid prefetcher 154 determines a hybrid prefetcher configuration to use based on the certainty scores obtained in step 304. In one example, the hybrid prefetcher 154 identifies the highest certainty score and uses the hybrid prefetcher configuration associated with the highest certainty score. In another example, the hybrid prefetcher 154 identifies all certainty scores within a threshold percentage of the highest certainty score and selects one of the hybrid prefetcher configurations associated with one of those certainty scores.

The method 300 may repeat as the hardware (e.g., processor(s) 151, cache(s) 152, and other hardware) executes. The hybrid prefetcher 154 may determine when to examine the trained prefetch model 156 to determine which hybrid prefetcher configuration to use at any technically feasible time. In an example, the hybrid prefetcher 154 determines which hybrid prefetcher configuration to use periodically.

Figure 3B:
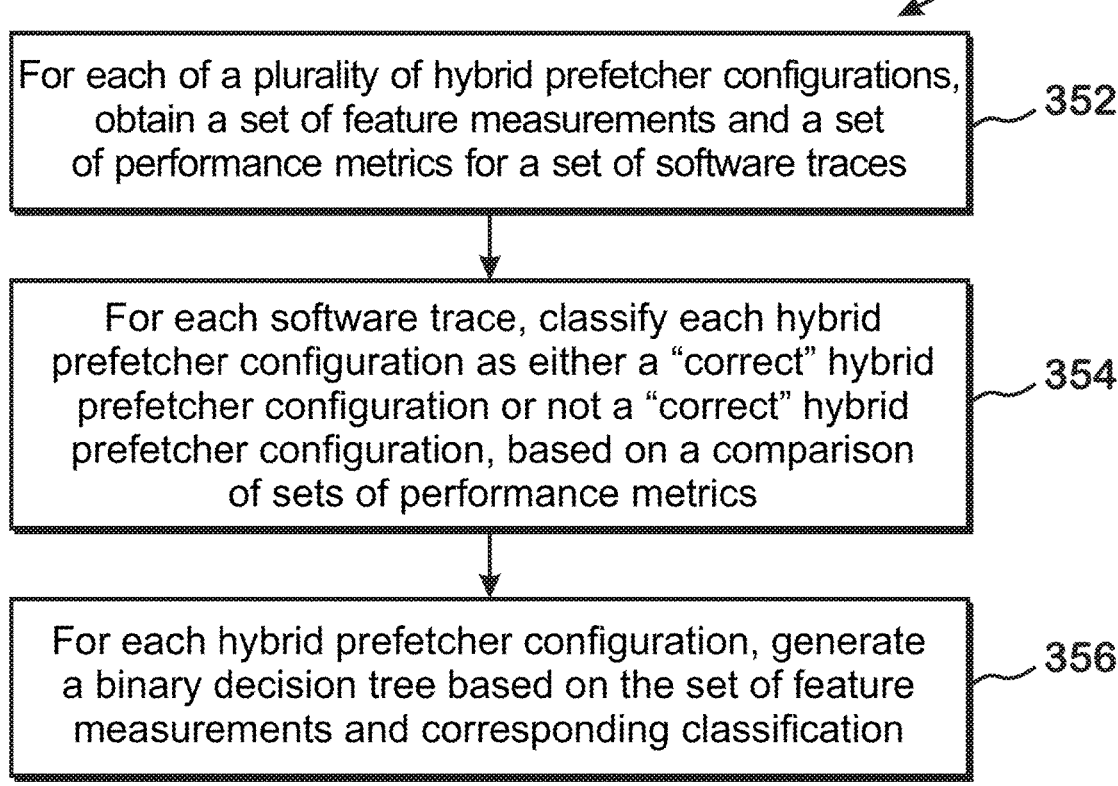
FIG. 3B is a flow diagram of a method for generating a trained prefetch model, according to an example.

FIG. 3B is a flow diagram of a method 350 for generating a trained prefetch model 156, according to an example. Although described with respect to the system of FIGS. 1A-1C and 2, those of skill in the art will understand that any system, configured to perform the steps of method 350 in any technically feasible order, falls within the scope of the present disclosure.

The method 350 begins at step 352, where, for each of a plurality of hybrid prefetcher configurations, a trainer 180 obtains a set of feature measurements and a set of performance metrics for a set of software traces. More specifically, the trainer 180 causes a plurality of traces to be executed. For each trace, the trainer 180 causes the trace to be executed at least once for each prefetcher configuration. For each such execution, the trainer 180 collects a set of feature measurements—measurements of each feature for which feature collection is to be performed. Example features include number of misses in a level 1 data cache, number of stores committed, number of microcode dispatch breaks, number of level 2 cache lines evicted, and others. In addition, for each such execution, the trainer 180 obtains a performance metric that indicates how "well" the trace was performed with a given prefetcher configuration. In an example, a performance metric is instructions per cycle.

At step 354, for each software trace, the trainer 180 classifies each hybrid prefetcher configuration as either a "most desirable" hybrid prefetcher configuration or not a "desirable" hybrid prefetcher configuration, based on a comparison of the sets of performance metrics. More specifically, for any particular trace, the trainer 180 determines the performance metrics associated with the hybrid prefetcher configurations for that trace. Then, the trainer 180 selects one or more of the performance metrics based on selection criteria and labels the feature measurements associated with the selected performance metrics as being "most desirable," while labeling the feature measurements associated with the non-selected performance metrics as not being "most desirable."

In an example, the trainer 180 labels the set of feature measurements associated with the highest (or lowest) performance metric as being "most desirable." In an example, the trainer 180 also labels one or more additional sets of features measurements as being most desirable where those feature measurements have performance metrics within a threshold percentage of the highest (or lowest) performance metric.

The result is a set of training data, where each item of training data includes a hybrid prefetcher configuration, a set of performance metrics for a trace, and a classification as either most desirable or not desirable. Conceptually the training data indicates, for any given trace, which prefetch configuration(s) is desirable. In terms of machine learning, for each hybrid prefetcher configuration, the training data includes a set of feature measurements, and whether those feature measurements are classified as "most desirable" or "less desirable" (or "not desirable"). This training data can also be viewed in terms of a separate set of training data for each hybrid prefetcher configuration. Each set of training data classifies the training input of feature measurements as either predicting that the associated hybrid prefetcher configuration should be used (where the feature measurements are classified as "most desirable") or predicting that the associated hybrid prefetcher configuration should not be used (where the feature measurements are classified as "less desirable").

At step 356, the trainer 180 generates a binary decision tree based on the feature measurements and corresponding classifications. Any technically feasible machine learning technique can be used to generate the binary decision tree, and some possible techniques include the nearest neighbor algorithm, a naive Bayes algorithm, a tree-based classifier such as a C4.5 decision tree classifier, a Ripper classifier, a support vector machine algorithm, a logistic regression algorithm, a multi-layer perceptron neural network with backward propagation technique, and a radial basis function neural network technique. As described elsewhere herein, each tree is associated with a particular hybrid prefetcher configuration. Decision nodes in each tree determine, based on a particular feature specified by the decision node, which direction to traverse in the tree. When a leaf node is arrived at, the leaf node provides a certainty score associated with the feature measurements used to arrive at the leaf node. The certainty score indicates how certain it is that the associated hybrid prefetcher configuration should be used, given the input feature measurements.

After generating the trees, the output is validated with validation data sets. The trainer 180 also identifies appropriate hyperparameters (e.g., by performing an exhaustive search) to use. Some example hyperparameters include maximum tree depth, minimum number of elements a leaf must contain, maximum number of nodes allocated to a tree, and maximum number of features allowed.

In some implementations, the trained prefetch model 156 is static and is not retrained during runtime. In other implementations, the trained prefetch model 156 undergoes retraining during runtime. In some implementations, the trained prefetch model 156 includes a fixed number of nodes. A random access memory ("RAM") includes one slot for each node. In such implementation, retraining occurs by modification of individual nodes (e.g., by modifying the thresholds for decision nodes or by modifying the certainty scores for leaf nodes). In such implementations, the modification of individual nodes is performed by overwriting the associated RAM slot.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for identifying a prefetcher configuration to use for prefetching operations by a hybrid prefetcher for a computing device, the method comprising:
   capturing a set of feature measurements from the computing device, wherein the feature measurements comprise measurements related to the performance of the computing device;
   determining, based on a plurality of prefetcher models and the set of feature measurements, a plurality of certainty scores for a plurality of hybrid prefetcher configurations, each model being related to a unique, separate hybrid prefetcher configuration, wherein each hybrid prefetcher configuration specifies which prefetchers of the hybrid prefetcher are switched on and which prefetchers of the hybrid prefetcher are switched off;
   selecting one of the hybrid prefetcher configurations based on the plurality of certainty scores, wherein the selected hybrid prefetcher configuration has a highest certainty score of the plurality of certainty scores or the selected hybrid prefetcher configuration has a certainty score that is within a threshold percentage of the highest certainty score of the plurality of certainty scores; and
   operating the hybrid prefetcher according to the selected hybrid prefetcher configuration.

2. The method of claim 1, wherein:
   determining the plurality of certainty scores comprises providing at least a portion of the set of feature measurements to a prefetcher model of the plurality of prefetcher models and receiving a certainty score in response.

3. The method of claim 1, wherein:
   each prefetcher model is a binary decision tree and includes one or more decision nodes and one or more leaf nodes.

4. The method of claim 3, wherein:
   the decision nodes include a threshold and specify a hardware feature type; and
   determining the plurality of certainty scores includes traversing a prefetcher model of the plurality of prefetcher models by comparing a hardware feature measurement to the threshold and traversing to a different node of the prefetcher model based on the comparison between the hardware feature measurement and the threshold.

5. The method of claim 4, wherein:
   the leaf nodes include a certainty score; and
   traversing a prefetcher model of the plurality of prefetcher models comprises arriving at a leaf node and setting a certainty score for the hybrid prefetcher configuration associated with the prefetcher model to be equal to the certainty score included in the leaf node.

6. The method of claim 1, further comprising:
   training prefetcher models of the plurality of prefetcher models based on a set of training data.

7. The method of claim 6, further comprising:
   obtaining the training data by executing a plurality of software traces for a plurality of hybrid prefetcher configurations and obtaining a set of hardware feature measurements for each execution of the software traces;

classifying the sets of hardware feature measurements based on performance metrics to generate classifications; and recording, as the training data, the hardware feature measurements, the hybrid prefetcher configurations for which the hybrid feature measurements were obtained, and the classifications.

8. The method of claim 1, wherein the selected hybrid prefetcher configuration has the highest certainty score of the plurality of certainty scores.

9. A prefetching system comprising:
a hybrid prefetcher; and
a prefetch model,
wherein the hybrid prefetcher is configured to identify a prefetcher configuration to use for prefetching operations by the hybrid prefetcher in a computing device, by:
capturing a set of feature measurements from the computing device, wherein the feature measurements comprise measurements related to the performance of the computing device;
determining, based on a plurality of prefetcher models and the set of feature measurements, a plurality of certainty scores for a plurality of hybrid prefetcher configurations, each model being related to a unique, separate hybrid prefetcher configuration, wherein each hybrid prefetcher configuration specifies which prefetchers of the hybrid prefetcher are switched on and which prefetchers of the hybrid prefetcher are switched off;
selecting one of the hybrid prefetcher configurations based on the plurality of certainty scores, wherein the selected hybrid prefetcher configuration has a highest certainty score of the plurality of certainty scores or the selected hybrid prefetcher configuration has a certainty score that is within a threshold percentage of the highest certainty score of the plurality of certainty scores; and
operating the hybrid prefetcher according to the selected hybrid prefetcher configuration.

10. The prefetching system of claim 9, wherein:
determining the plurality of certainty scores comprises providing at least a portion of the set of feature measurements to a prefetcher model of the plurality of prefetcher models and receiving a certainty score in response.

11. The prefetching system of claim 9, wherein:
each prefetcher model is a binary decision tree and includes one or more decision nodes and one or more leaf nodes.

12. The prefetching system of claim 11, wherein:
the decision nodes include a threshold and specify a hardware feature type; and
determining the plurality of certainty scores includes traversing a prefetcher model of the plurality of prefetcher model by comparing a hardware feature measurement to the threshold and traversing to a different node of the prefetcher model based on the comparison between the hardware feature measurement and the threshold.

13. The prefetching system of claim 12, wherein:
the leaf nodes include a certainty score; and
traversing a prefetcher model of the plurality of prefetcher models comprises arriving at a leaf node and setting a certainty score for the hybrid prefetcher configuration associated with the prefetcher model to be equal to the certainty score included in the leaf node.

14. The prefetching system of claim 9, further comprising:
a trainer configured to train prefetcher models of the plurality of prefetcher models based on a set of training data.

15. The prefetching system of claim 14, wherein the trainer is further configured to:
obtain the training data by executing a plurality of software traces for a plurality of hybrid prefetcher configurations and obtaining a set of hardware feature measurements for each execution of the software traces;
classify the sets of hardware feature measurements based on performance metrics to generate classifications; and
record, as the training data, the hardware feature measurements, the hybrid prefetcher configurations for which the hybrid feature measurements were obtained, and the classifications.

16. The prefetching system of claim 9, wherein the selected hybrid prefetcher configuration has the highest certainty score of the plurality of certainty scores.

17. A computing device including:
a processor;
a cache;
a hybrid prefetcher; and
a prefetch model,
wherein the hybrid prefetcher is configured to identify a prefetcher configuration to use for prefetching operations by the hybrid prefetcher, by:
capturing a set of feature measurements from the computing device, wherein the feature measurements comprise measurements related to the performance of the computing device;
determining, based on a plurality of prefetcher models and the set of feature measurements, a plurality of certainty scores for a plurality of hybrid prefetcher configurations, each model being related to a separate hybrid prefetcher configuration, wherein each hybrid prefetcher configuration specifies which prefetchers of the hybrid prefetcher are switched on and which prefetchers of the hybrid prefetcher are switched off;
selecting one of the hybrid prefetcher configurations based on the plurality of certainty scores, wherein the selected hybrid prefetcher configuration has a highest certainty score of the plurality of certainty scores or the selected hybrid prefetcher configuration has a certainty score that is within a threshold percentage of the highest certainty score of the plurality of certainty scores; and
operating the hybrid prefetcher according to the selected hybrid prefetcher configuration.

18. The computing device of claim 17, further comprising:
a trainer configured to:
obtain training data by executing a plurality of software traces for a plurality of hybrid prefetcher configurations and obtain a set of hardware feature measurements for each execution of the software traces;
classify the sets of hardware feature measurements based on performance metrics to generate classifications, and
record, as the training data, the hardware feature measurements, the hybrid prefetcher configurations for which the hybrid feature measurements were obtained, and the classifications.

19. The computing device of claim 17, wherein the selected hybrid prefetcher configuration has the highest certainty score of the plurality of certainty scores.

* * * * *